United States Patent [19]
Stowell et al.

[11] 4,318,245
[45] Mar. 9, 1982

[54] VOCALIZING APPARATUS

[75] Inventors: Roger H. Stowell; Michael O. Hirtle, both of East Aurora, N.Y.; Russell W. Brown, Nepean; Arthur D. Moore, Stittsville, both of Canada

[73] Assignee: The Quaker Oats Company, Chicago, Ill.

[21] Appl. No.: 114,219

[22] Filed: Jan. 22, 1980

[51] Int. Cl.³ .............................................. A63H 3/28
[52] U.S. Cl. ....................................... 46/232; 46/117; 179/1 SM; 200/61.52
[58] Field of Search .................. 46/232, 117, 175 AR; 35/8 A, 35 C; 179/1 SA, 1 SM, 1 SG; 200/61.45 R, 61.52, DIG. 29; 364/513

[56] References Cited

U.S. PATENT DOCUMENTS

| | | | |
|---|---|---|---|
| 3,162,980 | 12/1964 | Hellman | 46/232 |
| 3,483,655 | 12/1969 | Mason | 46/117 X |
| 3,560,680 | 2/1971 | Clarke | 200/61.45 R |
| 3,636,654 | 1/1972 | Workman | 46/175 AR |
| 4,189,779 | 2/1980 | Brautingham et al. | 35/35 C |
| 4,221,927 | 9/1980 | Dankman et al. | 46/232 X |
| 4,249,338 | 2/1981 | Wexler | 46/232 |

FOREIGN PATENT DOCUMENTS

| | | | |
|---|---|---|---|
| 2300407 | 10/1976 | France | 200/61.52 |
| 680161 | 10/1952 | United Kingdom | 46/117 |

Primary Examiner—F. Barry Shay
Attorney, Agent, or Firm—Cumpston & Shaw

[57] ABSTRACT

Vocalizing apparatus for use in a doll which has a synthesizer for producing speech sounds. The synthesizer is controlled by a digital controller having a memory which stores information representing a vocabulary of infant-like sounds. A motion detector, which may be in the form of a gravity-actuated switch, activates the controller so as to cause the synthesizer to produce a pattern of sound simulating happy infant sounds when the doll is moved and when it is cuddled, and fussing or crying sounds when it is thereafter not moved for a time. The electronic apparatus is shut down if the doll is left unmoved for a time after it no longer emits the fussing sounds but is automatically activated when again it is moved. The vocalizing apparatus is provided in a self-contained package, removable for laundering.

25 Claims, 8 Drawing Figures

| SOUND | ID. NO. | CODE | SPEED |
|---|---|---|---|
| /ei/ | 1 | S5 | 32 Hz |
| BLANK | 2 | S0 | 12 |
| HE HE | 3 | S4 | 32 |
| /ma/ | 4 | S7 | 12 |
| UH OH | 5 | S6 | 12 |
| /ia/ | 6 | S3 | 12 |
| MA MA | 7 | S2 | 32 |
| /ei/ | 8 | S5 | 12 |
| BLANK | 9 | S0 | 12 Hz |
| HE HE | 10 | S4 | 12 |
| /ia/ | 11 | S3 | 12 |
| UH OH | 12 | S6 | 32 |
| /ma/ | 13 | S7 | 32 |
| BLANK | 14 | S0 | 12 |
| HIC | 15 | S1 | 32 |
| MA MA | 16 | S2 | 12 |
| CRY | 17 | S8 | 12/32 |

FIG. 7

VOCALIZING APPARATUS

DESCRIPTION

The present invention relates to vocalizing apparatus and particularly to a system for electronically producing predetermined patterns of selected sounds depending upon external events.

The invention is especially suitable for use in providing a speaking doll which voices different patterns of sound when moved and when immobile so as to simulate an infant which emits happy sounds and fussing or crying sounds depending upon whether it is being cuddled. Other aspects of the invention are applicable to vocalizing apparatus generally, and particularly to sound synthesizers. Still other aspects of the invention are applicable to switches which are sensitive to motion and similar mechanical actuation events.

Although dolls and other toys with speaking capabilities have been proposed, they required complex and difficult to operate devices, such as keyboards for their actuation. Known speaking dolls also have a very limited vocabulary of one or two sounds, usually produced when a bellows is operated to force air through a specially shaped windpipe. Attempts to use phonograph-type sound producing devices in dolls are not entirely satisfactory because of the limited vocabulary available and because the device must be specially actuated, as by pulling a string. The problem of providing a speaking doll which can produce a reasonable vocabulary of sounds is made difficult by reason of the limited space available within a body of a doll of reasonable size.

It is also important that the doll simulate a real life infant in order to be attractive to the child who plays with it. Infants utter different sounds depending upon how they are handled. Happy sounds are voiced when the infant is cuddled. Upon being left alone as in its crib, the infant may emit fussing or crying sounds. No speaking dolls have ever been available which emit different patterns of sounds automatically, depending upon how they are handled.

The principal object of the invention is to provide an improved doll having an electronic voice.

Another object of the invention is to provide an improved doll with an electronic voice which is activated by moving the doll as when it is picked up or cuddled.

A further object of the invention is to provide apparatus for producing different sound patterns similar to infant vocalizations depending upon different external events.

A still further object of the invention is to provide improved vocalizing apparatus which produces a vocabulary of sounds, the pattern of which changes in a random manner, as for example with a predetermined probability of occurrence of a change in pattern at predetermined intervals.

A further object of the invention is to provide improved motion responsive vocalizing apparatus.

A further object is to provide vocalizing apparatus, especially adapted for use in dolls and toys, which is electronically operated to provide a pattern of sounds which changes depending upon the state of motion of the apparatus.

A still further object of the invention is to provide an improved battery-powered speaking doll which emits a pattern of different baby-like sounds when in motion and which electronically shuts itself off, thereby increasing battery life when not in motion for a length of time.

A still further object of the invention is to provide an improved synthesizer for electronically generating a pattern of sounds.

A still further object of the invention is to provide vocalizing apparatus which enables a doll to speak a reasonable vocabulary of speech sounds and which is adapted to be located in a package of such size as to be confined in the body of a baby doll.

A still further object of the invention is to provide an improved switch device which provides switch closures to detect motion when in certain positions.

A still further object of the invention is to provide improved vocalizing apparatus in a small self-contained package which can be completely removed from a doll or toy so that, for example, the doll or toy may be laundered, or a battery disconnected or removed for changing, carrying or shipping.

Briefly described a vocalizing apparatus embodying the invention makes use of a synthesizer. The synthesizer produces sounds by generating signals in a plurality of different bands such as occupied by the plurality of formants of speech. A controller, preferably a digital controller having a memory storing information representing different speech sounds operates the synthesizer. The controller has means for selectively producing the sounds in different patterns. The position responsive means activates the controller, and conditions the controller to provide signals to the synthesizer representing different sound patterns depending upon the external events. The apparatus is preferably contained in the body of a doll. In the event that the doll is moved, for example cuddled, the sounds produced are happy sounds. But when the doll is not moved for a while, the fussing or crying like sounds are produced.

The foregoing and other objects, features and advantages of the invention as well as a presently preferred embodiment thereof will become more apparent from a reading of the following description in connection with the accompanying drawings in which:

FIG. 7 is a table showing the vocabulary of sounds.

Figure 1:
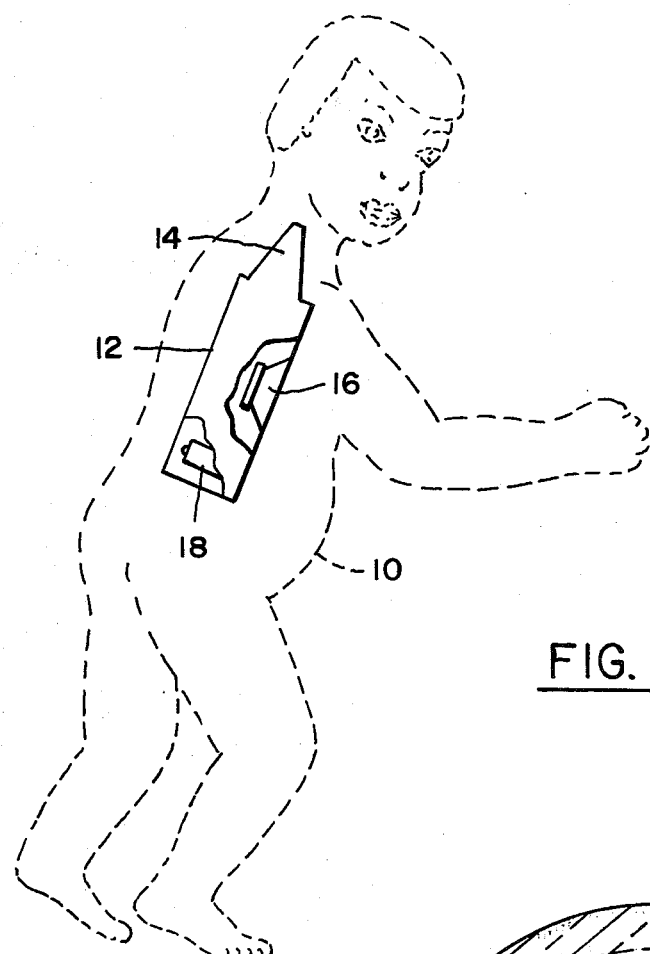
FIG. 1 is a side view showing a speaking doll in accordance with the invention having a package containing apparatus which causes the doll to produce infant-like sounds.

Referring more particularly to FIG. 1 there is shown in dotted lines a baby doll 10. A generally rectangular package 12 containing electronic apparatus for producing sound simulating baby utterances is disposed within the body of the doll 10. The package may be inserted through a zippered opening (not shown) in the back of the doll. The package is a generally rectangular housing which may, for example, be approximately 2" wide, 4" long, and 1" high so as to be contained readily within the body of a doll of reasonable size, say 12" to 18" in length. A conical extension 14 at the upper end of the package 12 is disposed within the neck portion of the doll and locates the package in vertical position within the body of the doll.

Figure 3:
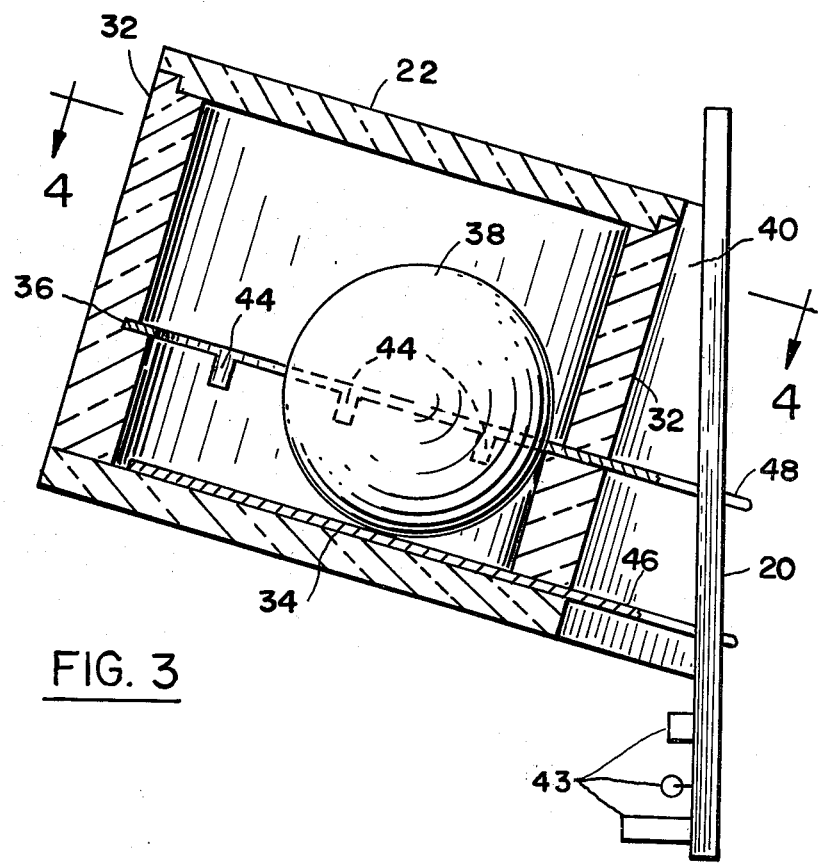
FIG. 3 is a sectional view of a motion-sensing switch which is used in the vocalizing apparatus provided by the invention.

The package is broken away in the drawing to illustrate a loud speaker 16 which may be mounted facing a grill of openings in the front of the package and a battery 18, such as a conventional 9 volt battery, which is mounted in a compartment at the bottom rear of the package. The electronic circuitry as well as the speaker and a motion detector switch are mounted on a circuit board contained within the package. The circuit board 20 and the switch 22 are illustrated in FIG. 3. The package 12 may easily be removed from the doll 10 so that the doll can be laundered and/or the battery 18 removed for changing or when the doll is to be shipped or stored.

Figure 2:
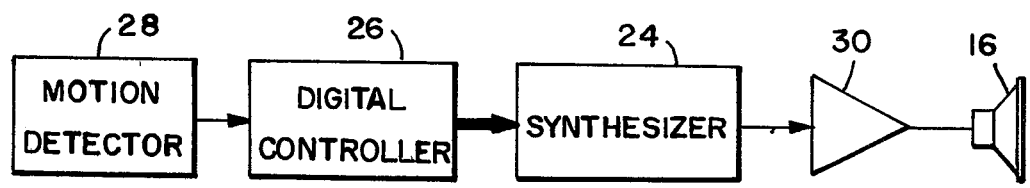
FIG. 2 is a simplified block diagram of vocalizing apparatus in accordance with the invention.

The electronic circuity is shown generally in FIG. 2. The speech sounds are generated in a synthesizer 24. A digital controller 26 controls the synthesizer to produce different patterns containing a plurality of sounds when actuated by position responsive means. The state of motion of the doll is detected by the position responsive means, which detects a change in position and motion of the doll, to actuate the controller and operate the synthesizer. A motion detector 28 is preferably used to detect the motion of the doll. This detector preferably includes a motion responsive switch. An example of a presently preferred embodiment of such a motion detector switch is the switch 22 illustrated in FIGS. 3 and 4. When motion of the doll such as picking it up or cuddling it are detected, the digital controller is activated and causes the synthesizer 24 to produce a pattern of happy sounds. The output of the synthesizer is an electronic signal which may be amplified in an amplifier 30. The amplifier drives the loud speaker 16. While the electronic circuitry may be implemented with discrete components, a large scale analog integrated circuit and a large scale digital integrated circuit may be used to principally provide the synthesizer 24 and the digital controller 26, respectively. Such integrated circuit may be constructed in accordance with techniques known in the arts.

Figure 4:
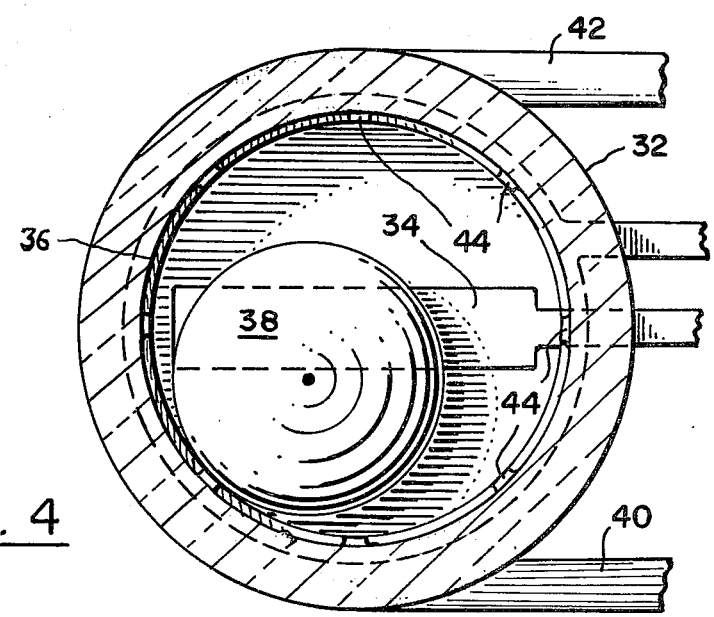
FIG. 4 is a sectional view of the switch shown in FIG. 3, taken along the line 4—4 in FIG. 3 when viewed in the direction of the arrows.

Consider the switch 22 which is used to detect the motion of the doll. It is shown in FIGS. 3 and 4. A housing 32 of insulating material contains contact elements 34 and 36 and a massive contactor element 38 in the form of a metal ball. The housing 32 is cylindrical and has a pair of triangular legs 40 and 42. These legs attach the housing to the circuit board 20 such that the axis of the housing is tilted. The ball 38 then rolls into a position when the board is vertical so that it can make contact with and connects the contact elements 34 and 36. The tilted orientation of the switch 22 also enables the ball to make contact between these elements 34 and 36 when the doll is lying on its back. When the switch 22 is in the position shown in FIGS. 3 and 4, the doll is upright. Then contact is capable of being made between the contact elements 34 and 36 by the ball 38. When the doll 10 is inverted (head down), the ball is disposed against the top end of the housing 32 and the switch is in open condition. In this position, motion of the doll does not activate the apparatus and sounds are not voiced. This is also the case when the doll is lying on its face because of the tilted orientation of the switch 22. Some of the components 43 are shown attached to the circuit board 20 together with the switch 22.

The interior of the housing 32 has a bottom wall, a cylindrical side wall, and a top wall. The top wall may be an insert which is attached to the side wall after the ball 38 is inserted in place. The contact element 34 is a strip of metal on the bottom end wall on which the ball would ride. The other contact element 36 is a ring with castellated tabs 44 along its inner periphery. Between the spaced tabs there is the insulating material of the housing (the side wall and top of the housing and the contact elements being molded as a unitary structure). Only the tabs 44 present conductive surfaces which can make contact with the ball 38. With the tabs and insulating plastic material therebetween there is a smooth surface against which the ball may roll. The diameter of the inner periphery of the ring 36 as well as the diameter of the interior of the housing 32 are greater than the diameter of the ball. The axial length of the housing is also greater than the diameter of the ball 38. The altitude of the ring 36 above the contact member 34 is preferably the radius of a ball 38; then when the doll is placed on its stomach or inverted, the ball 38 rolls past the ring 36 and assures that no contact is made between the ring 36 and the contact member 34.

In operation when the doll is moved, the ball 38 makes intermittent contact with the ring 36. The doll must be inverted (head down) for contact between the elements 34 and 36 to be broken. Then the ball 38 moves to the top of the housing 32. The ball has inertia and any movement of the doll, as when it is picked up or cuddled, causes intermittent contact to be made and broken between the contact elements 34 and 36. Tabs 46 and 48 from the strip contact 34 and the ring contact 36, respectively, are brought out to the circuit board 20 and connected, as by printed wiring thereon, to the circuit components of the digital controller. As will be seen in FIG. 6A, the switch 22 is connected to a pulse generator 50 which translates current from the battery 18 into pulses indicative of the motion of the doll 10.

Figure 5:
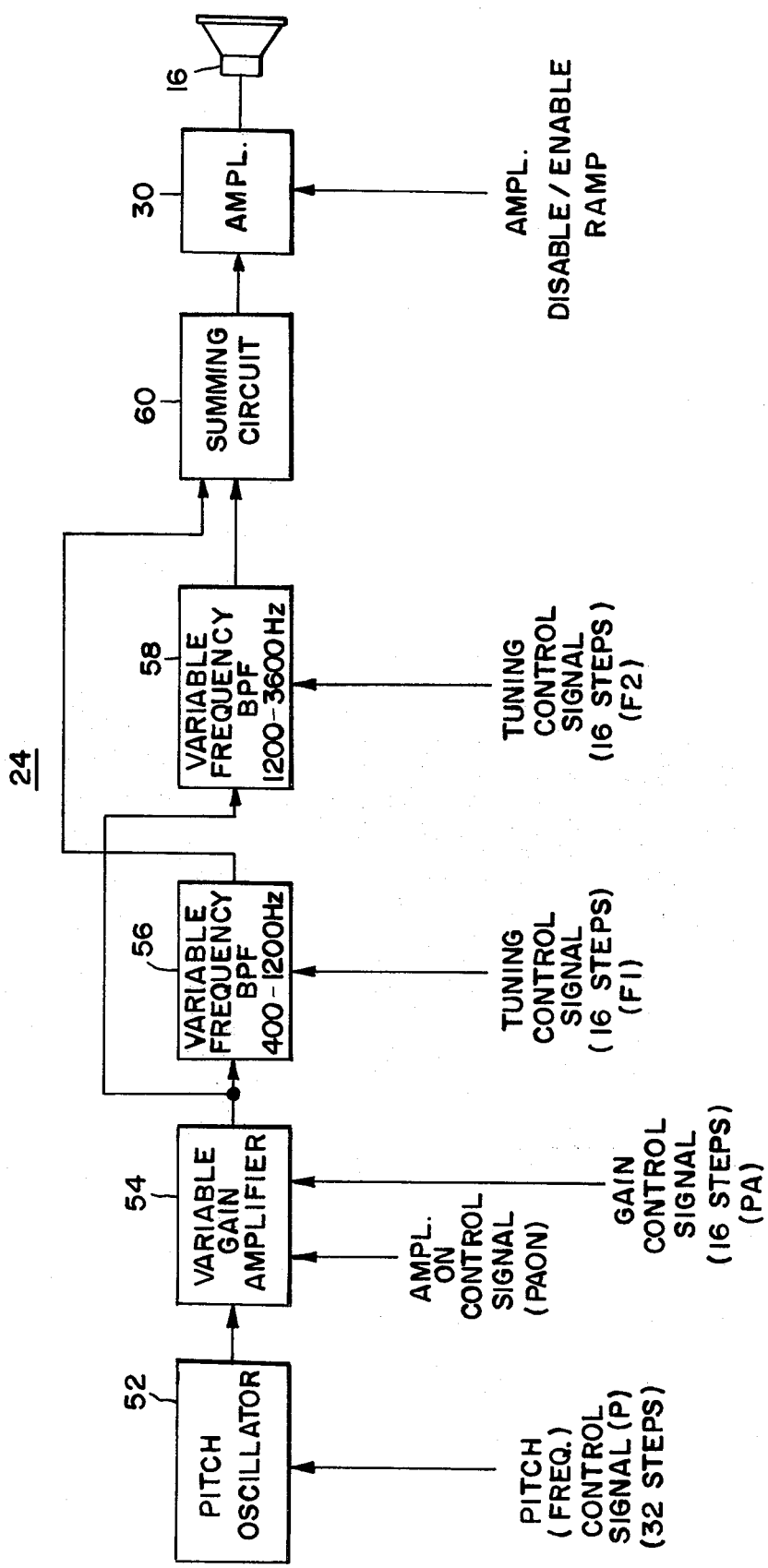
FIG. 5 is a block diagram of the synthesizer portion of the vocalizing apparatus provided by the invention.

The synthesizer 24 is shown in FIG. 5. It contains a variable frequency pitch oscillator 52, preferably a sawtooth oscillator, which produces a repetitive signal rich in harmonics. A variable gain amplifier 54 controls the amplitude of the pitch signal from the oscillator 52. Two parallel connected variable frequency band pass filters 56 and 58 serve as formant filters and simulate two formants of speech. A single formant may be operative to provide speech-like sounds. However, a pair of formants each covering a separate frequency range are preferred. More accurate simulation of speech may be obtained with additional formant filters. The formants covered by the filters are 400 to 1200 Hz in case of the filter 56 and 1200 to 3600 Hz in case of the filter 58. The outputs of these filters are combined as by being added in a summing circuit 60 and applied to an amplifier 30 which drives the loud speaker 16.

A pitch frequency control signal (P) generated in the digital controller 26 is applied to the pitch oscillator. This signal (P) has 32 steps of amplitude change and may be a control current. The signal (P) consequently provides for 32 steps of frequency of the pitch oscillator signal. These frequency steps may vary logarithmically. Two control signals also generated in the digital controller are applied to the variable gain amplifier 54. These are amplifier on control signals (PAON) and a gain control signal (PA). The amplitude control signal must be present to turn the synthesizer on and allow the pitch signal to be transmitted. It is used to provide blanks or no sound intervals during the pattern of sounds which is generated, as well as during an initial period after motion is first detected to allow time for the circuitry to stabilize after the power is applied thereto. The gain control signal is variable in 16 steps and provides 16 different pitch signal amplitudes. Tuning control signals, also variable in 16 steps (F1) and (F2), are applied to the band pass filter 56 and the band pass filter 58, respectively. These signals determine the filter center frequencies and the formant's spectral characteristics. The control signals (P), (PA), (F1) and (F2) vary with time in a pattern determined by the digital information stored in the digital controller 26. They cause the amplitude and spectral characteristics of the signal to be varied so as to synthesize the different sounds.

Another signal is applied to the amplifier 30. This is in the form of a ramp control signal which gradually enables the amplifier 30 or disables that amplifier to the end that noise or clicks when power is applied to or disconnected from the circuitry, are not produced as disturbing sounds by the speaker 16. The circuits of the synthesizer 24 may be current controlled, and the control signals (P), (PAON), (PA), (F1) and (F2) and the ramp may be control currents. In the event that the pitch oscillator 52 and the other circuits 54, 56, 58 and 60 of the synthesizer are voltage controlled, variable voltages may be used for the control signals.

Figure 6A:
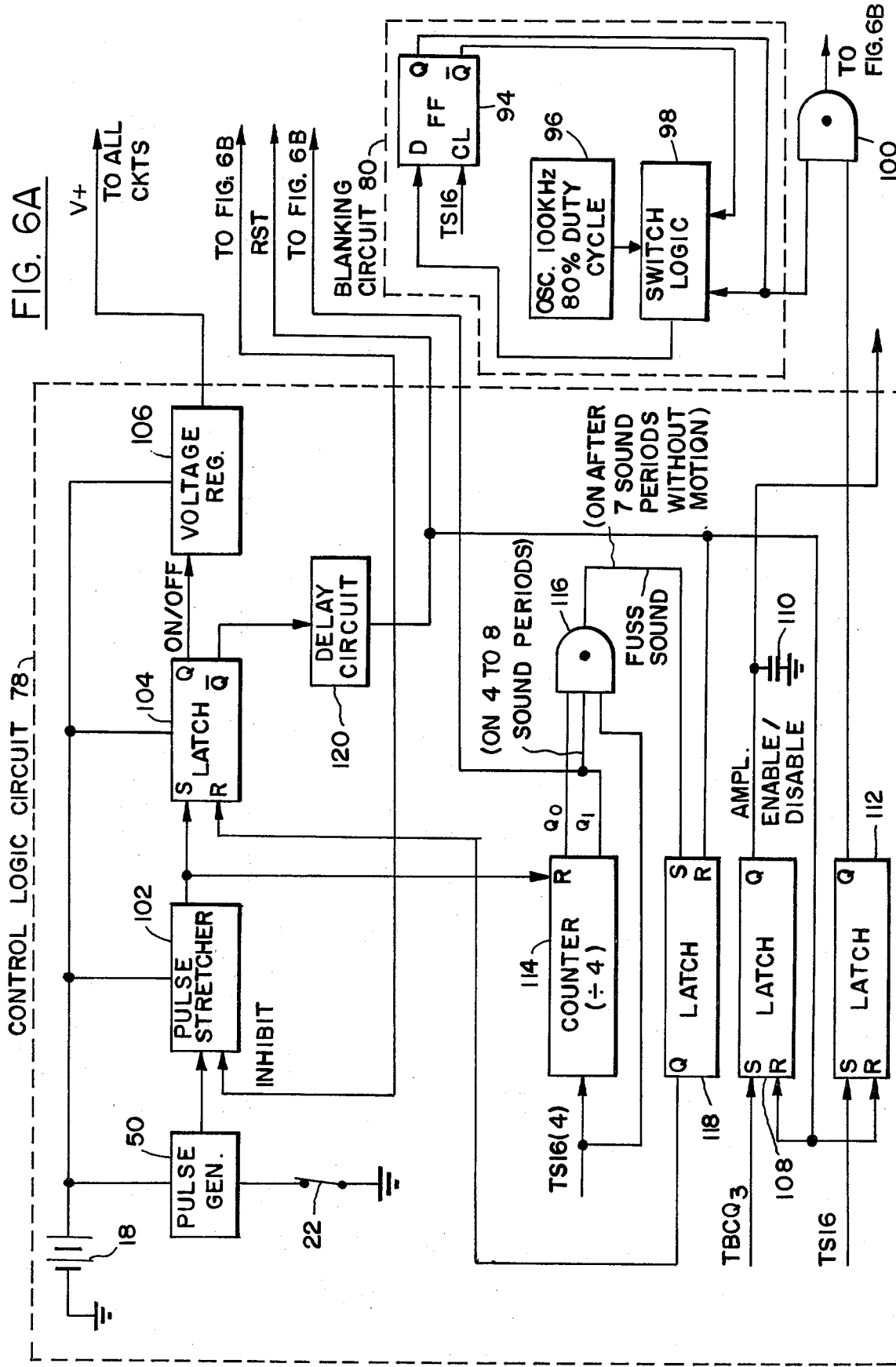
FIG. 6A and FIG. 6B are block diagrams of the digital controller of the apparatus provided by the invention.
Figure 6B:
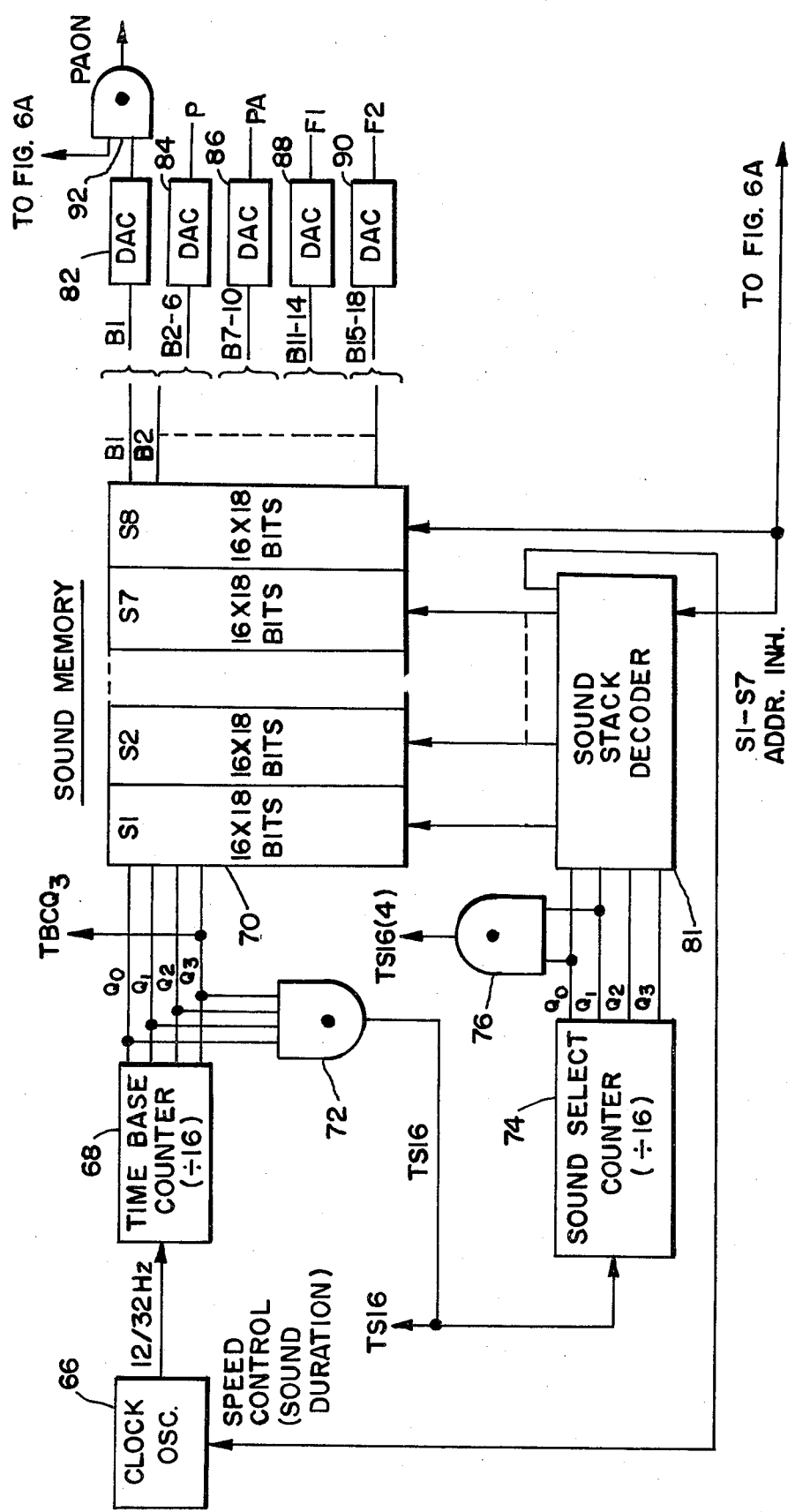

Referring next to FIGS. 6A and 6B there is shown the digital controller 26 which generates the control signals for the synthesizer 24. In the digital controller 26, a clock oscillator 66 provides the time reference for the apparatus. The clock oscillator is switched by a speed control signal input thereto to oscillate and provide clock pulses at a lower frequency and at a higher frequency. In this embodiment of the invention, the frequencies are 12 Hz and 32 Hz. These two speeds provide different durations for most of the sounds and effectively increase the vocabulary of the doll. With the exemplary frequencies of 12 and 32 Hz, the duration of the sounds are approximately $\frac{1}{2}$ second at the higher clock pulse frequency and $1\frac{1}{4}$ seconds at the lower clock pulse frequency. The clock oscillator 66 may be electronically switched by the speed control signal to provide the two clock pulse frequencies.

A time base counter 68 divides the clock pulse frequency and provides a number of time slots equal to its dividing ratio for each sound in the vocabulary. In the illustrated embodiment, the counter 68 is a four bit, divide by 16, binary counter, which counts the clock pulses from the clock oscillator 66. Four binary outputs $Q_0$ through $Q_3$ from the counter address word locations in a sound memory 70. An AND gate 72, which is connected to the output of the counter 68, provides an output pulse when the counter reaches its maximum count of 16. This pulse is indicated as TS16. The time base counter 68 sequences through 16 time slot intervals for each sound. A count of 0000 corresponds to the beginning of a sound and a count of 1111 corresponds to the end of the same sound. These counts appear on the binary outputs $Q_0$ to $Q_3$ of the counter 68. When the time base counter 68 reaches the end of a sound (1111), it causes a sound select counter 74 to increment. In the illustrated circuit, the counter 74 is a divide by 16, four bit binary counter similar to the time base counter 68. It will be appreciated, as the description proceeds, that the dividing ratio of the counter depends upon the organization of the sound memory 70, particularly the number of bits in each byte or word therein and the number of sounds in the vocabulary.

Another AND gate 76, which is connected to the $Q_0$ and $Q_1$ outputs of the sound select counter 74, provides a pulse every fourth count or for every sixty-fourth clock pulse. This output is indicated as TS16(4). Another output is obtained from the $Q_3$ output bit of the time base counter 68 and changes state every eighth clock pulse. This output is indicated as $TBCQ_3$.

The sound select counter 74 is programmed to select the sound in a pattern. The desired speed (fast or slow) for each sound is also selected. There is a happy mode pattern of seven happy words in the herein illustrated embodiment of the invention. There is a fussing mode pattern of crying sounds. The sounds are voiced either at fast or slow speeds such that the vocabulary is almost doubled. The fuss mode makes two sounds to simulate the cry of an infant child. These are played at fast and slow speeds predetermined alternately. The predetermined alternating duration of the cry sound emulates the cry of an infant.

The table in FIG. 7 identifies the 16 possible outputs of the sound select counter and an additional seventeenth output. The 16 outputs occur sequentially. They are identified in FIG. 7 by identification numbers (IDNO) 1–16. Each is a different baby sound, such as "mama" (IDNO. 7). For example, the sound "mama" is played at high speed for approximately $\frac{1}{2}$ second when the sound select counter output represents identification No. 7 and at low speed for approximately $1\frac{1}{4}$ seconds when the sound select counter output represents identification No. 16. Two different sounds are thereby produced from the same information in the sound memory.

The fuss mode and the fast and slow speed fuss sounds are indicated in the table of FIG. 7 as the cry sounds at INDO. 17. The cry sounds are selected when the doll is not moved for at least a predetermined time after it has been moved. In other words, the fuss mode or pattern is not entered until a predetermined time has elapsed after the doll's motion state has changed from the state where the doll has been moved to a state where it has not been moved. These states are detected by the motion detection switch which is contained in the control logic circuit 78 (FIG. 6A) of the digital controller. The control logic circuit 78 is described more fully hereinafter. As shown in the table of FIG. 7, a few of the time intervals allocated to the sounds in the pattern are blank or silent. These are represented by IDNO.s 2, 9 and 14 in the table. Blank intervaalso be selected by means of a blanking circuit 80 at random with a predetermined probability of occurrence at predetermined intervals, which in this case is each sound interval of every 16 time slots.

The synthesizer is also blanked or silenced when power to the circuit is turned on and off. This occurs, for example, when the doll is not moved for a predetermined time longer than the fuss mode time. The somewhat random blanking intervals interrupt the happy mode pattern and effectively change the pattern by eliminating certain sounds during the sound intervals which are blanked. The sounds produced by the doll are therefore not predictable, much as is the case with a real life infant.

The sound memory 70 is divided into separate data blocks for storing information corresponding to different sounds in each of the blocks. These blocks are indicated in the drawing as S1 to S7 and S8. The sound stored in each of the blocks is indicated in the Code column of the table shown in FIG. 7. The Code S0 represents a blank so that no block is allocated for the blank interval. In this example, each block contains 16 eighteen bit, bytes or words of digital information. For the complex sounds, for example "mama", in blocks S2, S4, S6 and S8 the data is contained in each of the 16 locations of the block. For simple words, in blocks S1, S3, S5 and S7 the data is located only in the first eight blocks. The blocks are selected by the sound stack decoder 81 which translates the binary output of the sound select counter 74 into a pointer which addresses and selects the blocks of the sound memory 70. The order or program of selection may be designed into the decoder 81. For example the decoder may be a memory which is addressed by the counter 74.

The decoder 81 also provides the speed control output to the clock oscillator 66. The data from a selected block is then read out either at fast or slow speed so as to increase the vocabulary of the sounds which the apparatus is capable of producing.

During the fuss mode, the output from the control logic circuit 78 selects the S8 block and inhibits the sound stack decoder 81, except for the output thereof which changes the speed of the clock oscillator 66. The speed or duration of the cry sound is then changed alternately but in the same order as that in which the speeds of the happy sounds are changed. For example, during the first four counter 74 output intervals (IDNOs. 1-4) the speed changes from fast to slow, then from slow to fast, then from fast to slow. The speed does not change again from slow to fast until counter interval 7 (See FIG. 7). The baby's cry thus warbles much like that of a crying real life infant.

Separate digital to analog converters (DAC) 82, 84, 86, 88 and 90 are connected to the output bit lines B1 through B18 of the sound memory 70. The B1 bit is converted by the DAC 82 into the PAON control signal which is applied to the variable gain amplifier 54 and blanks or inhibits the audio output from the synthesizer 24. The control circuit also may operate to blank or inhibit the synthesizer output. An AND gate 92 is inhibited by the control logic circuit 78 or the blanking circuit 80 when the synthesizer is blanked under control logic 78 or blanking circuit 80 control (FIG. 6A). In this embodiment, the DAC 82 handles only one bit and provides the proper levels for turning the variable gain amplifier on or off.

The DAC 84 produces the pitch frequency control signal (P). To provide 32 steps of amplitude variation of this signal (P) and of pitch variation, five bits B2 to B6 are applied to the input of the DAC 84. Similarly, four separate groups of bits, B7 to B10, B11 to B14, and B15 to B18 are applied to the DACs 86, 88 and 90 to produce the 16 step gain and tuning control signals, (PA), (F1) and (F2). The outputs $Q_0$ through $Q_3$ from the time base counter 68, thus address the memory locations for each block of the memory S1 to S8 selected by the decoder 81. Of course, no blocks (S0) may be selected. The data is converted into control signals which operate the synthesizer to synthesize the sounds corresponding to the data stored in the memory blocks or to blank the sounds for each sound interval. Also, if either the blanking circuit 80 or the control logic circuit 78 forces the AND gate 92 to produce a low output, the sound is blanked independently of the data from the sound memory 70.

The blanking circuit 80 provides blank sound intervals on a random basis with a predetermined probability of occurring during each sound interval. There is a predetermined probability that the next sound after a voiced sound will be blanked and a predetermined probability that the sound following a blanked sound will be voiced. The blanking circuit 80 thus quiets the doll to the extent of the selected probability of blanking occurrence. In this embodiment, the probability of blanking may be about 80%. Blanking upon occurrence of each sound interval is timed by the TS16 output from the AND gate 72 which clocks a D flip flop 94. The Q output of the D flip flop determines whether the synthesizer is blanked. The state of the flip flop 94 depends upon the phase of oscillator 96. This oscillator runs on a much higher frequency than the rate at which sounds are produced. It has a duty cycle approximately equal to the desired probability. In this example, the oscillator is a 100 KHz square wave oscillator having an 80% duty cycle. Electronic switch logic 98 is controlled by the oscillator output. When the oscillator output is high, the Q output of the flip flop is connected to the D input thereof and when the oscillator output is low the $\overline{Q}$ output is connected to the D input. Each time the flip flop 94 is clocked, the flip flop has an approximately 80% probability of changing state. Thus at the onset of each sound interval, as timed by the TS16 pulse, a new output is used to determine whether the next sound in the pattern will be voice or blank.

An AND gate 100 provides the blanking circuit output to the PAON gate 92. When this output is high, the sound may be voiced by the synthesizer. In order to prevent vibration of the speaker 16 from activating the digital controller and being mistaken for motion of the doll, it may be desired to inhibit the transmission of motion indicating pulses when the synthesizer is on. To this end an inhibit output is obtained from the AND gate 100. The use of this output is optional and it may be omitted if more than a desired number of motion indicating pulses may be missed.

The control logic circuit 78 senses inputs from the motion switch 22 and controls the operating modes of the apparatus. The motion sensing circuitry includes the pulse generator 50 and a pulse stretcher 102, such as a one shot which may be inhibited when the PAON gate 92 is enabled as discussed above. The battery 18 is connected to the motion sensing circuitry (to the pulse generator 50, the pulse stretcher 102, and to a latch 104). The latch 104 is set upon occurrence of a motion indicating pulse at the pulse stretcher output. The latch 104 provides an on/off control level to a voltage regulator 106 which provides operating power (indicated as V+) to all of the other circuits of the digital controller 26 as well as of the synthesizer 24. When voltage is applied to the circuit, the clock oscillator and the counters 68 and 74 can begin to operate. A small amount of stay alive or trickle current may be continuously applied to the counter 74 to allow it to maintain its count. Then upon power coming up to operating level, the pattern of sound will continue from where it left off, rather than always starting with the same sound.

Upon power coming up, a latch 108 is set by the TBCQ$_3$ transition to generate the amplifier enable ramp. A capacitor 110 provides for ramp generation. The amplifier 30 is then enabled only after the system is stabilized and ready to produce the sounds. Upon occurrence of the TS16 pulse, another latch 112 is set. This latch enables the gate 100. The PAON control signal for the variable gain amplifier then can go high so as to permit the sounds to be synthesized.

The apparatus operates in the happy mode and produces the sounds from blocks S1 to S7 of the memory 70. The absence of motion of the doll for a predetermined period of time is detected by a counter 114 and an AND gate 116. The counter 114 may be a two bit (divide by four) counter which counts up every four sound intervals upon occurrence of the TS16(4) transition. This counter is reset by the motion indicating pulses from the pulse stretcher 102. When no motion indicating pulses have been received for two TS16(4) transitions, the $Q_1$ output of the counter 14 goes high and switches the apparatus to the fuss mode. This $Q_1$ output goes high when no motion indicating pulses are produced for four to eight sound intervals depending on the timing of the last motion indicating pulse relative to the TS16(4) transition. The decoder 81 is inhibited and all happy sounds are disabled. The cry sound from block S8 of the memory is selected. The cry sound is repeated six or seven times. Preferably, the blanking circuit is inhibited when the fuss mode is selected so that no blank intervals occur. The clock speed is changed so that the cry sounds warble as explained above.

After six or seven intervals, the TS16(4) input to the AND gate 116 causes the gate to set a latch 118. This latch resets the latch 104 which turns off the voltage regulator 106 and powers down the entire apparatus except for the motion detecting circuitry and trickle current to the counter 74. After a short delay due to a delay circuit 120, a reset pulse RST occurs which reset the latches 108, 112 and 118. The amplifier enable/disable control signal is ramped down and the circuit is conditioned to wait for the next movement of the doll when operating power is again increased to operating levels.

From the foregoing description it will be apparent that there has been provided an improved speaking doll, vocalizing apparatus, and also an improved synthesizer and a motion sensing switch. Variations and modifications in the herein described apparatus will undoubtedly suggest themselves to those skilled in the art. The foregoing description should therefore be taken as illustrative and not in a limiting sense.

We claim:

1. Vocalizing apparatus comprising means for synthesizing a plurality of different sounds, means for controlling and operating said synthesizing means to produce a sequence of said sounds in a predetermined pattern, position responsive means for activating said controlling means, and means controlled by said controlling and operating means for operating said synthesizing means to produce the same sound in different locations in said pattern at different durations.

2. Vocalizing apparatus comprising means for synthesizing a plurality of different sounds, means for controlling said synthesizing means to produce a sequence of said sounds, said controlling means including means for operating said synthesizing means to produce said sounds in a predetermined pattern, position responsive means for activating said controlling means, and said operating means including means operating said synthesizing means to blank the production of sounds during selected intervals in said pattern.

3. Vocalizing apparatus comprising means for synthesizing a plurality of different sounds, means for controlling said synthesizing means to produce a sequence of said sounds, said controlling means including means for operating said synthesizing means to produce said sounds in a predetermined pattern, position responsive means for activating said controlling means, and said operating means further comprising means for operating said synthesizing means for blanking, with a predetermined probability of occurrence at predetermined times, the production of each sound in said pattern.

4. The apparatus as defined in claim 3 wherein said blanking means comprises oscillator means which generates an output having a duty cycle equal to said probability, a source of repetitive pulses occurring at the onset of each of said sounds in said pattern, a flip flop which provides a control signal for blanking said synthesizing means when said flip flop is in one of its states, and means for switching the state of said flip flop upon occurrence of said pulses from said source when said oscillator output is in a certain part of said duty cycle.

5. Vocalizing apparatus comprising means for synthesizing a plurality of different sounds, means for controlling said synthesizing means to produce a sequence of said sounds, position responsive means for activating said controlling means, and means in said controlling means for operating said synthesizing means to provide a selected pattern of said sounds when said position responsive means remains in the same position for a certain length of time.

6. The apparatus as set forth in claim 5 wherein said controlling means further includes means for operating said synthesizing means to discontinue the production of said sounds when said position responsive means remains in the same position at least a predetermined length of time which is longer than said certain length of time.

7. A speaking doll having a vocabulary of a plurality of sounds comprising means for synthesizing and voicing said sounds, means for operating said synthesizing means to produce a pattern of said sounds, means for controlling said operating means to activate said operating means depending upon the state of motion of said doll, said operating means comprising digital controller means for storing information representing said sounds, and means for generating control signals corresponding to said information in predetermined sequences to cause said pattern of sounds to be synthesized by said synthesizing means, said controlling means comprising means for providing signals indicating movement of said doll, said digital controller means further comprising means responsive to said indicating signals for operating said control signals generating means to produce said sounds in a first pattern when said doll is moved and in a second pattern when said doll is not in motion for at least a first predetermined period of time after having been moved.

8. The invention as defined in claim 7 wherein said first pattern has happy sounds so as to simulate the utterances of an infant when it is moved during cuddling and said second pattern simulates the crying of the infant when it is not moved.

9. The invention as set forth in claim 7 wherein said means responsive to said indicating signals further comprises means for inhibiting operation of said synthesizing means when said doll is not in motion for at least a second predetermined period of time longer than said first predetermined period of time.

10. The invention as defined in claim 9 further comprising a source of operating power for said synthesizing, operating, and controlling means, said inhibiting means comprising means for disconnecting said source from said synthesizing and operating means, said source being connected continuously to said controlling means for operating said inhibiting means to reconnect said synthesizing and operating means to said source when said doll is again moved.

11. The invention as defined in claim 7 wherein said indicating signal providing means comprises a motion responsive switch.

12. The invention as defined in claim 11 wherein said motion responsive switch comprises a housing defining a closed interior, at least two contact elements in said housing, and a contactor having a predetermined mass movable in the interior of said housing to make contact between said contact elements.

13. The invention as defined in claim 12 wherein said contactor is a ball of conductive material of a diameter smaller than said housing interior.

14. The invention as set forth in claim 13 wherein said contact elements comprise a contact member presenting a contact surface at one end of the interior of said housing, a generally circular contact ring having an inner diameter larger than the diameter of said ball, said ring being spaced from said contact member a distance less than the diameter of said ball such that said ball makes intermittent contact between said contact plate and ring when said doll is moved.

15. The invention as defined in claim 14 wherein the interior of said housing has a cylindrical wall, and means for mounting said housing with said axis of said cylindrical wall at such an inclination that said ball rolls into a position to make contact between said contact ring and plate when said doll is upright or is lying on its back.

16. A speaking doll having a vocabulary of a plurality of sounds comprising means for synthesizing and voicing said sounds, means for operating said synthesizing means to produce a pattern of said sounds, means for controlling said operating means to activate said operating means depending upon the state of motion of said doll, said operating means comprising digital controller means for storing information representing said sounds, means for generating control signals corresponding to said information in predetermined sequences to cause said pattern of sounds to be synthesized by said synthesizing means, said synthesizing means comprising means for generating signals representing a plurality of formants of speech, means for combining said formant representing signals, means for producing said sounds in response to said combined formant signals, means responsive to said control signals for varying the pitch, amplitude and band pass characteristics of said formant signals, said formant signals producing means comprising pitch oscillator means, amplifier means, and a plurality of band pass filter means, each having a different pass band range, said pitch oscillator means being connected to said amplifier means and said amplifier means being connected to said band pass filter means, said digital controller comprising a memory for storing a plurality of groups of multi-bit digital words, each group representing at least one of said sounds, a plurality of digital to analog converter means each responsive to different bits of said words for producing different ones of said control signals which control the pitch frequency of said oscillator, the gain of said amplifier, and the pass band of said filters, respectively.

17. The invention as defined in claim 16 wherein the digital controller further comprises means for enabling said words in each of said groups of words to be read out of said memory into said converter means such that sounds are produced in selected order.

18. The invention as defined in claim 17 wherein said enabling means comprises a clock oscillator and first and second counters, said first counter being connected to said clock oscillator for counting the clock pulses therefrom and said second counter being connected to said first counter, said first counter being connected to said memory to address successive words in each of said groups in said memory to enable read out thereof, and means for connecting said second counter to said memory to address said groups therein in sequence to enable read out of the words in said groups, said second counter having a capacity to count to a higher number than the number of said groups so as to enable read out of words representing silent intervals between said sounds.

19. The invention as defined in claim 17 further comprising means for enabling selected groups of said words to be read out of said memory at at least two durations such that the number of said sounds is increased.

20. The invention as set forth in claim 19 wherein said enabling means comprises a clock oscillator, means for counting clock pulses from said clock oscillator, and means responsive to said counter means for shifting said frequency of said clock oscillator between a lower and a higher frequency when the counter reaches predetermined counts.

21. The invention as defined in claim 17 wherein one of said groups of words represents a crying sound, said controlling means comprising means for addressing said memory to cause one of said groups to be read out when the state of motion of said doll has changed from a first state where it is moved to a second state where it is not moved and said doll remains in said second state at least a certain length of time, such that a crying sound is then produced.

22. The invention as defined in claim 21 further comprising means for shifting the duration at which said one group of words are read out from a slower to a higher speed to change the manner in which the crying sound is voiced.

23. The invention as set forth in claim 17 wherein said controlling means further comprises means for conditioning at least one of said control signals to cause said synthesizing means to provide blank periods with no sound which occur with a predetermined probability at successive intervals of time.

24. A system for synthesizing a plurality of speech sounds in sequence comprising means for producing a complex pitch signal, means responsive to a plurality of control signals for varying the spectral and amplitude characteristics of said pitch signal to simulate a formant of said speech sounds, control means for sequentially generating selective ones of a plurality of sequences of said control signal, each said sequence representing a different one of said plurality of sounds, means for applying said control signals from said generating means to said producing means and to said spectral and amplitude characteristics varying means to synthesize said speech sounds, said pitch signal producing means being a variable frequency pitch oscillator, said means for varying the spectral and amplitude characteristics of said pitch signal comprising a variable gain amplifier and a plurality of variable band pass filters, said filters being connected in parallel to said amplifier, said amplifier being connected to said oscillator, and means for varying the pitch frequency of said oscillator, the gain of said amplifier and the band pass location in frequency of said plurality of said filters, each with a different one of said control signals.

25. The invention as defined in claim 24 further comprising a loud speaker and means for driving said loud speaker in response to the sum of the signals from said filters.

* * * * *